United States Patent Office 3,632,839
Patented Jan. 4, 1972

3,632,839
HEAT AND LIGHT STABILIZED VINYL HALIDE COMPOSITION
David W. Young and Robert C. Strand, Homewood, and Donald L. Marion, Hillside, Ill., assignors to Atlantic Richfield Company, Philadelphia, Pa.
No Drawing. Continuation of application Ser. No. 375,330, June 15, 1964. This application Oct. 21, 1968, Ser. No. 769,432
Int. Cl. C08f 29/24
U.S. Cl. 260—898         10 Claims

ABSTRACT OF THE DISCLOSURE

Vinyl halide compositions are stabilized against degradation under the influence of heat or light by the addition of small amounts of resinous copolymers of styrene and maleic anhydride or metal salts thereof. Salts employed are of boron, aluminum and metals of Groups II and IV of the Periodic Table.

This application is a continuation of application Ser. No. 375,330, filed June 15, 1964, now abandoned.

The present invention relates to stabilized vinyl halide resin compositions. More particularly, the invention concerns vinyl halide resins stabilized with a copolymer of styrene and maleic anhydride or with certain metal salts thereof.

Vinyl halide resins, in general, are well known to the art and their soluble properties as components of solid plastic compositions of various types have been recognized. It is also known that vinyl halide resins are sensitive to both heat and light as manifested by discoloration. By way of illustration, in the compounding and processing of these resins into molded and extruded articles such as synthetic fibers and films, or as constituents of coating compositions, it is usually necessary to subject the resins to elevated temperatures. Under such conditions a tendency of the resins toward progressive yellowing or darkening is commonly encountered. Consequently, it has become the practice to incorporate small amounts of stabilizing materials into the resins to retard or inhibit this degradation or discoloration. Many stabilizers have been suggested for this purpose, the most prominent of which are the organo-metallic compounds, particularly those containing tin or lead, such as dibutyl tin, dibasic lead phosphate, dioctyl tin maleate, lead stearate, etc. Unfortunately, however, many of these stabilizers have not been found entirely satisfactory for one reason or another. Hence, there exists a continuing demand for new stabilizers.

It has now been found that such vinyl resins can be effectively stabilized against degradation under the influence of heat or light by incorporating therein resinous copolymers of styrene and maleic anhydride having about 1 to 3 moles of styrene per mole of maleic anhydride or a Group II, IV and the aluminum and boron metal salts of such resinous copolymers. The resinous copolymers of the invention generally have molecular weights of at least about 600. The molecular weight may be up to about 50,000 or more, often up to about 2000. Preferably, the molecular weight is not so high as to render insoluble in water the alkali metal salt of the copolymer from which the metal salts of the invention are formed. The melting points of the lower molecular weight copolymers, i.e. the copolymers of about 600 to 2000 molecular weight, will usually fall within the range of about 80 to 200° C. as determined by the Fisher-Johns Melting Point Apparatus.

The styrene-maleic anhydride copolymer additive of the present invention can be obtained by any desired method. A preferred method is by solution polymerization where the monomers are polymerized in a suitable solvent employing as a catalyst a free-radical peroxide catalyst, preferably benzoyl peroxide or dicumyl peroxide, at a temperature of about 75 to 300° C. or more. Suitable solvents include the aromatic hydrocarbon solvents which can be either the active aromatic solvents, that is, containing an active hydrogen atom, such as cumene, p-cymene, etc. or the non-active aromatic solvents such as xylene, toluene, etc. The active aromatic solvents are chain-terminating solvents and produce lower molecular weight copolymers than do the non-active aromatics under similar conditions. Other suitable solvents are the ketones, such as methyl ethyl ketone, which are also active solvents.

The preferred manner of carrying out the polymerization is by what is known in the art as incremental feed addition. By this method the monomers and catalysts are first dissolved in a portion of the solvent in which the polymerization is to be conducted and the resulting solution added in increments to a reactor containing the solvent. The resulting mixture is then heated to reaction temperature which is usually the reflux temperature of the mixture. When an aromatic solvent is employed in the polymerization, the formation of the copolymer causes a heterogeneous system, the polymer layer being the heavier layer and recoverable by merely decanting the upper aromatic solvent layer and drying. On the other hand, when a ketone is used as the solvent, the formed copolymer is usually soluble in the solvent media so that recovery of the product by a solvent stripping operation is necessary.

The metal salts of the copolymers can be prepared by first forming the more or less full alkali metal salt of the copolymer by simply hydrolysis of the copolymer with water in the presence of an alkali metal hydroxide, including ammonium hydroxide. The hydrolysis can be conveniently carried out by making a slurry in distilled water of at least 2 moles of alkali metal hydroxide per mole of the repeating copolymer unit and heating over a water bath until the hydrolysis is complete. Any of the alkali metal hydroxides, such as the hydroxide of sodium, potassium, lithium and ammonium can be employed, but sodium hydroxide is preferred.

An aqueous solution of the alkali metal salt of the copolymer thus formed is then preferably added to at least about stoichiometric amounts of an inorganic or organic salt of a metal selected from boron and aluminum and the Group II and IV metals of the Periodic Table as, for example, zinc, magnesium, cadmium, barium, tin, cobalt, titanium, mercury, lead, etc., which salt is soluble in the solution of the alkali metal salt of the copolymer. The preferred metals are zinc, tin, barium, lead and boron, and the preferred metal salts are those readily water-soluble as, for instance, the water-soluble metal chlorides, nitrates and acetates. It is preferred that the metal salt be in aqueous solution on addition of the alkali metal salt solution of the aqueous solution of the copolymer. Addition with continuous stirring provides the novel metal salts of the invention which are insoluble in the reaction medium and precipitate immediately out of solution.

The concentration of the copolymers or metal salts of the copolymer in the polymeric materials, which constitute the major amount of the composition of the invention, can vary but in all cases is a minor amount sufficient to stabilize the polymeric materials against degradation. Usually the additive concentration is about 0.01% to 5% by weight preferably 0.25% to 2%.

As employed herein, the term "vinyl halide resin" is meant to include those resins prepared by the polymerization of a vinyl halide either alone, or in conjunction with other ethylenically unsaturated polymerizable monomers, such as vinylidene chloride, acrylonitrile, styrene, vinyl esters of aliphatic acids, as for instance vinyl acetate, alkyl esters of monoolefinic acids, as for instance, dialkyl fumarate or maleate, and the like; and also vinylidene chloride polymer. The monomers other than the vinyl halide often are of 2 to 10 carbon atoms and preferably are monovinyl structures having an alpha olefin bond. The solid vinyl halide concerned with here is ordinarily the major constituent, preferably at least about 75% of the vinyl halide resin, and is preferably the chloride, although the other halides, such as the bromide and fluoride, are also contemplated. Other ethylenically unsaturated monomers which can constitute the minor constituent of the vinyl halide resin are often present in an amount up to about 25% or up to about 10%, more commonly about 5% by weight. The vinyl halide resins generally have Staudinger molecular weights of about 30,000 to 150,000, preferably about 50,000 to 75,000. The invention is of particular merit when applied to vinyl halide resins prepared by the polymerization of vinyl chloride either alone, or in conjunction with acrylonitrile, vinylidene chloride or both, or with vinyl acetate, and especially the vinyl chloride-vinyl acetate polymer resins.

If desired, other known stabilizers can be utilized in combination with the stabilizer of the present invention. Illustrative of known stabilizers are the organo-metallic compounds of Group II and IV in the Periodic Table such as the basic lead salts, tin compounds, barium salts of organic acids, alkaline metal salts of weak organic acids of 4 to 18 carbon atoms, etc. Specific compounds include the following: dibasic lead stearate, lead orthosilicate, co-precipitated lead orthosilicate and silica gel, normal lead salicylate monohydrous tribasic lead maleate, barium ricinoleate, barium ricinoleate modified with 2-ethyl hexanoic acid, dibasic lead carbonate, sodium citrate, monohydrous tribasic lead sulphate, dibasic lead phosphate, dibasic lead phthalate, dibutyl tin dilaurate, cadmium naphthenate, dibutyl tin diacetate, basic lead hydroxyl-naphthenate, various organic strontium salts such as strontium naphthenate.

It is also to be understood that other ingredients commonly added to vinyl halide resin compositions such as plasticizers, pigments, dyes, fillers, etc., may also be incorporated into the vinyl halide resins. Among the more popular plasticizers, for instance, are the monomeric ester plasticizers obtained from the reaction of a carboxylic acid and an alcohol having 4 to 12 carbon atoms. Examples of suitable plasticizers are dioctyl phthalate, di-2-ethylhexylphthalate, isooctyl sebacate, isooctyl adipate, and polyester polymers of polyalkanols and polycarboxylic acids.

The following examples are included to illustrate the preparation of the copolymer and metal salts of the copolymer used as resin additives in this invention.

EXAMPLE I 777 grams of maleic anhydride, 828 grams of styrene and 6.3 grams of dicumyl peroxide are dissolved in 4468 ml. of cumene. The resulting solution is then fed over a 30-minute period into a 5 gallon reactor containing 4000 ml. of cumene heated to 200° C. (reflux temperature). The reactor is equipped with a stirrer, reflux condenser, thermometer, separator funnel and heating mantel. The reaction temperature of 200° C. is maintained throughout the 30-minute period. Upon completion of the feeding, the material is cooled to room temperature and the excess cumene decanted. The solidified copolymer (wet with cumene) is then ground, washed with petroleum ether, suction filtered and dried in a 90 to 100° C. oven for 1 hour. The copolymer analyzed as follows:

Viscosity, cs. at 30° C. (10% by weight/vol. in acetone) _____ 0.658
Melting range, ° C. _____ 145–160
Molecular weight,[1] approx. _____ 1350

[1] Calculated by intrinsic viscosity.

EXAMPLE II

In a two-liter resin kettle was slurried 1 mole of the copolymer of Example I and 2 moles of sodium hydroxide (15% solution in $H_2O$). The slurry was heated on a water bath at 70–80° C. to hydrolyze the copolymer. The hydrolysis was completed in about 1½ to 2 hours.

28.0 grams of the sodium salt of the copolymer thus prepared was diluted to 100 ml. with distilled water. 32.7 grams of $Cd(NO_3)_2 \cdot 4H_2O$ was dissolved in distilled water and the resulting solution then added to the solution of the sodium salt of the copolymer with continuous agitation. An insoluble cadmium salt of the copolymer immediately precipitated out of solution. The mixture was then heated on a 70° C. water bath for 15–20 minutes and filtered. The insoluble cadmium salt of the copolymer was then washed and filtered. The cadmium salt of the copolymer analyzed as follows:

Percent Cd: 32.2
Percent C: 35.10
Percent H: 3.51
Percent O: 39.07
Melting point, ° C.: +300
Color: Yellow

EXAMPLE III

The tin salt of the copolymer made in Example I was prepared employing the procedure of Example II. The amounts of the reactants employed were as follows:

|  | 1 mole, g. | Amount used, g. |
|---|---|---|
| $SnCl_4$ | 260.5 | 52.8 |
| Copolymer (Na salt) | 264.0 | 52.1 |

The tin salt analyzed as follows:
Percent Sn++++ _____ 12
Percent C _____ 43
Percent H _____ 4.7
Percent O _____
Melting point, ° C. _____ +300
Color _____ White

EXAMPLE IV 20.2 grams of a copolymer of styrene and maleic anhydride having 1 mole of styrene per mole of maletic anhydride and a molecular weight of about 1600 was added to a solution of 48 milliliters of 28% ammonium in 150 milliliters of water. The addition was carried out at 50° C. and required about 30 minutes to effect complete solution. 33.1 grams of lead nitrate was dissolved in 75 milliliters of water. Both the lead nitrate solution and copolymer salt solution were heated to 83–85° C. The lead nitrate solution was added slowly over a 30-minute period to the copolymer salt solution. A precipitate formed which could be redispersed by addition of a few drops of acetic acid. After about 20% of the lead nitrate solution had been added a gummy precipitate formed which could not be redispersed with additional acetic acid. Addition of the remainder of the lead nitrate caused the gradual formation of a white precipitate. The precipitate was filtered and washed repeatedly until the filtrate no longer gave a positive test for lead ion. The copolymer salt was vacuum dried for 18 hours at 15° C. A yield of 30.3 grams was obtained and since the theoretical weight for lead per anhydride unit equals 42.5 grams, the conversion to the lead salt was 71%. The lead salt analyzed as follows:

Percent Pb: 27.7
Percent C: 40.66
Percent H: 4.47
Percent O: ——
Belting point, ° C.: +300
Color: Gray

EXAMPLE V

The boron salt of the copolymer employed in Example IV can be prepared using the procedure of Example IV but using at least about stoichiometric amounts of $BCl_3$ instead of lead nitrate.

EXAMPLE VI

The aluminum salt of the copolymer employed in Example IV can be prepared using the procedure of Example IV using $AlCl_3$ instead of the lead nitrate.

EXAMPLE VII

The following example is presented to demonstrate that advantageoius stabilizing characteristics provided polyvinyl chloride resins by the additives of the present invention.

Compositions containing 100 parts polyvinyl chloride resin (Geon 121), 50 parts di-2-ethylhexylphthalate (as plasticizer) and 2 parts of the copolymer or salts of Examples II, III or IV or a mixture thereof were each milled at 280 to 295° F. on a 2 roll even speed rubber mill for 5 minutes after which the plastic composition was taken off the mill as a sheet. The sheet was cut in 1″ x 6″ strips and subjected to aging or curing in a circulating air oven at 350° F. for 35 minutes. Samples were rated visually, the degree of stability of the sheet being represented by the depth of discoloration. For a comparsion, a composition without the additive of the present invention was similarly formulated and tested. The results of the tests are shown in the following table:

| Test | Additive | Color of sheet milled |
|---|---|---|
| I | None | Red-black. |
| II | Copolymer of Example I | Clear. |
| III | Cd salt of Example II | Very slightly yellow. |
| IV | Pb salt of Example IV | Slightly yellow. |
| V | {Pb salt of Example IV (1 part), Copolymer of Example I (1 part)} | Very slightly yellow. |
| VI | Sn salt of Example III | Yellow. |

The results demonstrate the advantageous stabilizing activity of the metal salts of the invention. Similar stabilizing activity can be obtained by using the metal salts of Examples IV and V.

EXAMPLE VIII

In a two-liter resin kettle was slurried 1 mole of a water-soluble copolymer of styrene and malic anhydride having 1 mole of styrene per mole of maleic anhydride and a molecular weight of approximately 1350, and two moles of sodium hydroxide (15% solution in water). The slurry was heated on a water bath at 70–80° C. to hydrolyse the copolymer. The hydrolysis was complete in about 1½ to 2 hours.

264 (1 mole) grams of the sodium salt of the copolymer prepared as above was diluted to 400 ml. with distilled water. 136.2 grams (1 mole) of zinc chloride was dissolved in distilled water and the resulting solution then added to the solution of the sodium salt of the copolymer with continuous agitation. An insoluble zinc salt of the copolymer immediately precipitated out of solution. The mixture was then heated in a 70° C. water bath for 15–20 minutes and filtered. The insoluble zinc salt of the copolymer was then washed and filtered. The zinc salt analyzed as follows:

Percent Zn: 14.9
Percent C: 35.0
Percent H: 5.6
Percent O: 24.6
Melting point ° C.: +300
Color: white

EXAMPLE IX

Compositions were formulated having 2 parts of the stabilizers shown in the table below. 65 parts dioctyl octyl phthalate and 100 parts polyvinyl chloride resin (Geon 121). Each of the compositions were tested according to the procedure of Example VII employing the following conditions:

Curing temperature: 350° F.
Cure periods, min.: 15, 25, 30, 35, 50, 60, 80
Film thickness: 9.5–10.0 mils In rating the effectiveness of the stabilizers at the various time periods a ratio of 10 (maximum stabilization) to 0 was used. For comparison a sample containing no stabilizer was also tested. The results were as follows:

| Heating time (min.) | 15 | 25 | 30 | 35 | 40 | 50 | 60 | 80 |
|---|---|---|---|---|---|---|---|---|
| No stabilizer | 10 | 10 | 9 | 8 | 8 | 5 | 5 | 5 |
| Copolymer of Ex. 1 | 10 | 10 | 10 | 8 | 8 | 7 | 7 | 7 |
| Cd salt of Ex. II | 10 | 10 | 10 | 10 | 8 | 8 | 8 | 6 |
| Pb salt of Ex. IV | 10 | 10 | 10 | 9 | 8 | 8 | 8 | 5 |
| Pb salt of Ex. IV and Cd salt of Ex. II (1:1) | 10 | 10 | 10 | 8 | 8 | 7 | 7 | 1 |
| Cd salt of Ex. II and Zn salt of Ex. VIII | 10 | 10 | 10 | 8 | 7 | 7 | 5 | X |
| Pb salt of Ex. IV and Zn salt of Ex. VIII | 10 | 10 | 10 | 8 | 7 | 7 | 5 | X |

The data shows the advantageous stabilization characteristics provided by the additives of the invention.

It is claimed:

1. A stabilized vinyl halide resin composition consisting essentially of a solid vinyl halide resin having a molecular weight of 30,000 to 150,000 and having as a major constituent vinyl halide polymer composed of a major amount of vinyl halide and 0 to 25 percent of ethylenically unsaturated monomer other than vinyl halide and a small amount, incorporated in said resin, of a resinous material selected from the group consisting of water-insoluble salts of resinous copolymers of styrene and maleic anhydride said copolymers having a molecular weight of 600 to 500,000 and having about 1 to 3 moles of styrene per mole of maleic anhydride selected from the group consisting of boron, aluminum, zinc, cadmium, tin, cobalt, titanium, and mercury salts, said small amount of the resinous material being sufficient to stabilize the vinyl halide resin against degradation in the presence of heat or light.

2. The composition of claim 1 wherein the amount of resinous material incorporated into the solid vinyl halide resin is about 0.01 to 5% by weight.

3. The composition of claim 1 wherein the copolymer utilized in the resinous material is of approximately one mole of styrene per mole of maleic anhydride.

4. The composition of claim 1 wherein the resinous material selected is the zinc salt of the copolymer of styrene and maleic anhydride.

5. The composition of claim 1 wherein the resinous material selected is the tin salt of the copolymer of styrene and maleic anhydride.

6. The composition of claim 1 wherein the resinous material selected is the boron salt of the copolymer of styrene and maleic anhydride.

7. The composition of claim 1 wherein the resinous material is the cadmium salt of the copolymer of styrene and maleic anhydride.

8. The composition of claim 1 wherein the amount of resinous material incorporated into the solid vinyl halide resin is about 0.25 to 2% by weight.

9. The composition of claim 1 in which the vinyl halide polymer is composed of from 100 to 90 weight percent vinyl halide and from 0 to 10 weight percent of ethylenically unsaturated monomer other than vinyl halide and having 2 to 10 carbon atoms and an alpha-olefin bond.

10. The composition of claim 1 in which the resinous material incorporated into the solid vinyl halide resin consists of a water-insoluble salt of a water-insoluble, resinous copolymer of styrene and maleic anhydride having about 1 to 3 moles of styrene per mole of maleic anhydride, said salt being selected from the group consisting of boron, aluminum, zinc, cadmium, tin, cobalt, titanium, and mercury salts.

References Cited
UNITED STATES PATENTS

| | | | |
|---|---|---|---|
| 2,483,959 | 10/1949 | Baer | 260—45.75 |
| 2,667,462 | 1/1954 | Wildish et al. | 260—17.4 |
| 3,005,802 | 10/1961 | Sellers | 260—78.5 |
| 3,231,524 | 1/1966 | Simpson | 260—2.5 |

MURRAY TILLMAN, Primary Examiner

C. J. SECCURO, Assistant Examiner

U.S. Cl. X.R.

260—23 XA, 31.6, 31.8 M, 45.75, 45.85, 899